United States Patent
Harter, Jr. et al.

(10) Patent No.: US 7,162,153 B2
(45) Date of Patent: Jan. 9, 2007

(54) APPARATUS FOR GENERATING A COMBINED IMAGE

(75) Inventors: Joseph E. Harter, Jr., Kokomo, IN (US); Gregory K. Scharenbroch, Kokomo, IN (US); Ronald M. Taylor, Greentown, IN (US)

(73) Assignee: Delphi Technologies, Inc., Troy, MI (US)

( * ) Notice: Subject to any disclaimer, the term of this patent is extended or adjusted under 35 U.S.C. 154(b) by 650 days.

(21) Appl. No.: 10/603,540

(22) Filed: Jun. 25, 2003

(65) Prior Publication Data

US 2004/0263612 A1    Dec. 30, 2004

(51) Int. Cl.
*G03B 35/10* (2006.01)
*H04N 13/02* (2006.01)

(52) U.S. Cl. ........................ 396/331; 348/49
(58) Field of Classification Search ............ 396/331, 396/324; 348/49, 148; 352/60, 132
See application file for complete search history.

(56) References Cited

U.S. PATENT DOCUMENTS

| | | | | |
|---|---|---|---|---|
| 1,655,850 A * | 1/1928 | Watts | ...................... | 396/331 |
| 4,093,364 A * | 6/1978 | Miller | ...................... | 352/132 |
| 5,856,888 A * | 1/1999 | Ross et al. | .................. | 359/857 |
| 6,356,854 B1 | 3/2002 | Schubert et al. | ............ | 702/150 |
| 6,447,132 B1 | 9/2002 | Harter, Jr. | ...................... | 362/29 |
| 6,574,048 B1 | 6/2003 | Nill | ............................. | 359/632 |
| 6,809,451 B1 * | 10/2004 | Brown | .................. | 310/156.08 |
| 6,862,140 B1 * | 3/2005 | Ogino | ........................ | 359/473 |
| 2002/0021354 A1* | 2/2002 | Suzuki et al. | ................. | 348/46 |

* cited by examiner

*Primary Examiner*—W. B. Perkey
(74) *Attorney, Agent, or Firm*—Jimmy L. Funke

(57) ABSTRACT

An apparatus for generating a combined image includes a first reflector, a second reflector, a third reflector, and a camera. In some embodiments, one or more of the reflectors may be movable between a first position and a second position. Additionally, the apparatus may change position to alter the target view of the apparatus.

17 Claims, 9 Drawing Sheets

APPARATUS FOR GENERATING A COMBINED IMAGE

TECHNICAL FIELD

The present disclosure generally relates to the generation of combined images, and more specifically to the generation of combined images using a single camera.

BACKGROUND OF THE INVENTION

A combined image is a collection of images depicting different perspective views of the same or different target areas. One form of a combined image is a collection of images depicting perspective views of different target areas. Another form of a combined image is a collection of images depicting perspective views of the same target area produced at different points in time. A further form of a combined image is a stereo image. A stereo image is a collection of images depicting different perspective views of the same target area. Typically, a stereo image is formed from a pair of images which show a single target from two different perspectives. By analyzing relational elements of the two images, three dimensional information relating to the target or target area can be extracted among other useful data.

Combined imaging systems are used to produce combined images. A stereo imaging system is a form of a combined imaging system and is used to produce stereo images. A typical stereo imaging system includes a pair of imagers, for example cameras, which cooperate to render two images each depicting a different perspective view of the same target. The two images are analyzed by a processing unit to extract predetermined data, for example, three dimensional information. Among the many applications for such systems, stereo imaging systems are used for numerous automotive applications including, for example, precrash warning, driver monitoring, and occupant positioning. In automotive applications, the size and expense of the stereo image system is an important consideration.

SUMMARY OF THE INVENTION

In accordance with one illustrative embodiment, an apparatus for generating a combined image of an object includes a first reflector, a second reflector in reflective communication with the first reflector and with a first portion of the object corresponding to a first perspective view of the object, a third reflector in reflective communication with the first reflector and a second portion of the object corresponding to a second perspective view of the object, and a camera. The camera receives the first and second perspective views from the first reflector and forms the combined image from the first and second perspective views.

In accordance with another illustrative embodiment, an apparatus for generating a combined image of an object includes a first reflector movable between a first position and a second position, a second reflector in reflective communication with the first reflector when the first reflector is in the first position and with a first portion of the object corresponding to a first perspective view of the object, a third reflector in reflective communication with the first reflector when the first reflector is in the second position and a second portion of the object corresponding to a second perspective view of the object, a camera receiving the first and second perspective views from the first reflector, and a processing unit coupled to the camera. The processing unit receives the first and second perspective views from the camera and forms the combined image from the first and second perspective views.

In accordance with a further illustrative embodiment, an apparatus for generating a combined image of an object includes means for reflecting a first perspective view of the object, means for reflecting a second perspective view of the object, and a camera. The camera receives the first and second perspective views and forms the combined image from the first and second perspective views.

These and other features of the present invention will become more apparent from the following description of the illustrative embodiments.

BRIEF DESCRIPTION OF THE DRAWINGS

FIG. 8b is a top plan view of the combined image system of FIG. 1 positioned to have a perspective view of a different target area than the target area of FIG. 8a.

DESCRIPTION OF THE ILLUSTRATIVE EMBODIMENTS

Figure 1:
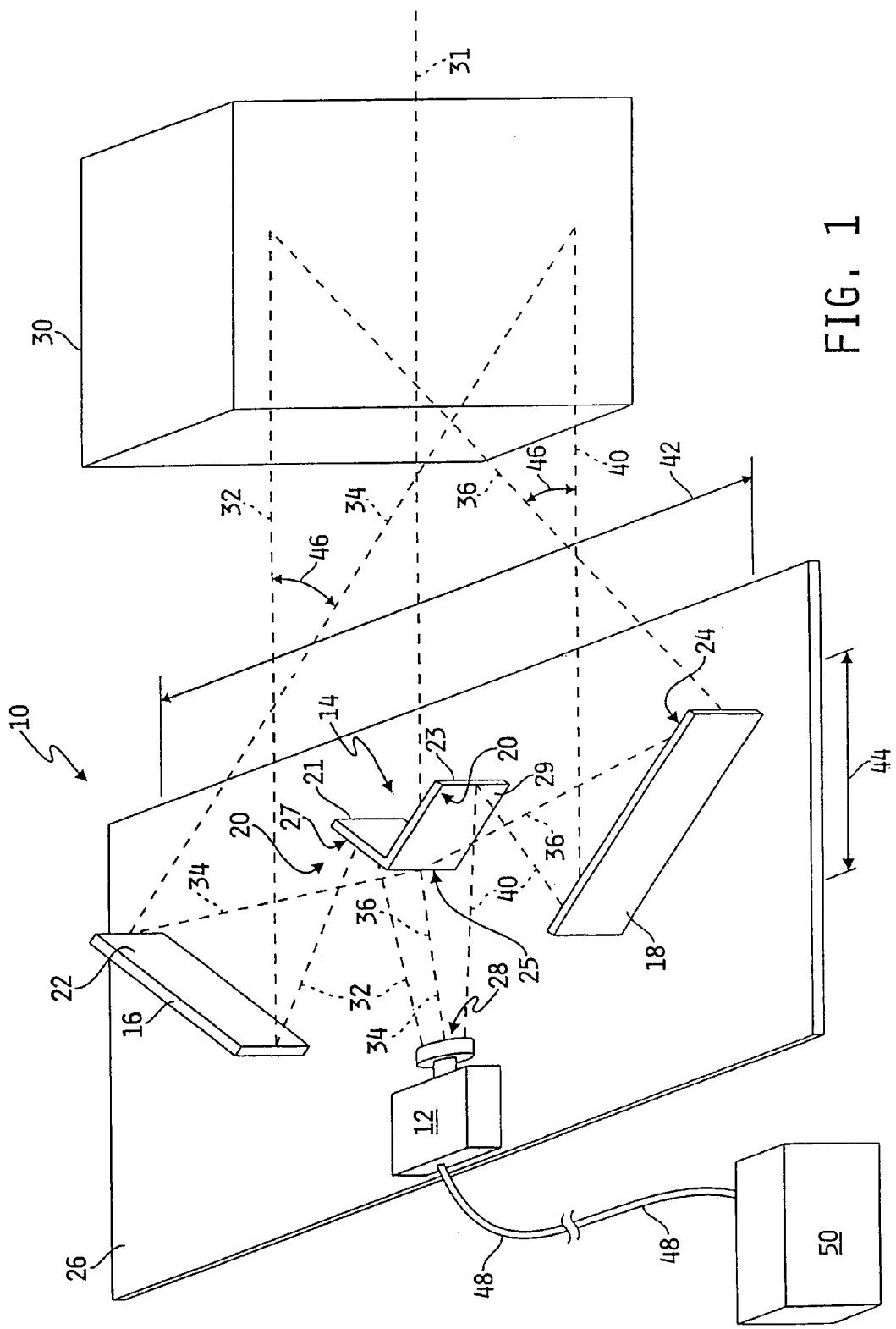
FIG. 1 is diagrammatic perspective view of one embodiment of a combined imaging system.

One embodiment of a combined imaging system 10 includes a camera 12, an on-frontal-axis reflector 14, and a pair of off-frontal-axis reflectors 16, 18, as illustrated in FIG. 1. Each of the reflectors 14, 16, and 18 has a substantially reflective side 20, 22, 24, respectively, capable of reflecting an image. Illustratively, the reflectors 14, 16, and 18 may be formed of a glass substrate having a silver nitrate composite film applied to one side of the glass substrate so as to form a reflective opposite side. However, other reflectors having at least one substantially reflective surface or side may be used. For example, reflectors having a highly polished metal surface are contemplated.

In the embodiment illustrated in FIG. 1, the on-frontal-axis reflector 14 is formed from a rectangular panel having a first end 21, a second end 23, and a substantially reflective side 20 defined by the ends 21, 23. The ends 21, 23 are displaced toward each other to form a vertex 25 substantially within the center of the reflector 14. In the embodiment illustrated in FIG. 1, the vertex 25 is defined by an acute angle so as to form a substantially "V" shaped top profile of the reflector 14. In other embodiments the vertex 25 may be defined by a right or obtuse angle. Additionally, the vertex 25 may be rounded so as to form a substantially "U" shaped top profile of the reflector 14. Regardless, a first portion 27 of the reflective side 20 is defined by the vertex 25 and the first end 21. A second portion 29 of the reflective side 20 is defined by the vertex 25 and the second end 23.

The camera 12 and the reflector 14 are secured to a suitable substrate 26 using appropriate fasteners, such as screws, bolts, nuts, or clamps. In some embodiments, the substrate 26 may be part of a housing or enclosure. The substrate 26 is rigid and includes a flat area suitable for securing the camera 12 and reflectors 14, 16, 18. The substrate 26 may be formed from any suitable material, for example, a plastic or metallic material may be used. A frontal axis 31 is defined to extend perpendicularly away from the center of the lens 28 of the camera 12 in a forward direction. The frontal axis 31 defines the center of the field of view of the lens 28 under normal operating conditions. The reflector 14 is positioned on the substrate 26 in front of the lens 28 of the camera 12 so as the vertex 25 lies substantially on the frontal axis 31. In this configuration, the first and second portions 27, 29 of the reflective side 20 of the reflector 14 are both in communication with the lens 28 of the camera 12.

The reflectors 16, 18 are also secured to the substrate 26 using suitable fasteners. The reflector 16 is positioned on the substrate 26 in front of the camera 12 but off the frontal axis 31. The reflector 16 is orientated so as the reflective side 22 of the reflector 16 is in reflective communication with a target area 30 and the first portion 27 of the reflective side 20 of the reflector 14. In this orientation, the reflector 16 is not in reflective communication with the lens 28 of the camera 12. Similarly, the reflector 18 is positioned on the substrate 26 in front of the camera 12 but off the frontal axis 31. The reflector 18 is positioned on an opposite side of the frontal axis 31 relative to the reflector 16. The reflector 18 is orientated so as the reflective side 24 of the reflector 18 is in reflective communication with the target area 30 and the second portion 29 of the reflective side 20 of the reflector 14. In this orientation, the reflector 18 is not in reflective communication with the lens 28 of the camera 12. In the embodiment illustrated in FIG. 1, the reflectors 16, 18 are isometrically positioned from the reflector 14. However, in other embodiments, the reflectors 16, 18 may not be isometrically positioned from the reflector 14.

The combined imaging system 10 also includes a processing unit 50. The processing unit 50 is electrically coupled to the camera 12 by a plurality of electrical interconnects 48. The electrical interconnects 48 may include such interconnects as wires, cables, Red-Green-Blue (RGB) cables, Bayonet Neill-Concelman (BNC) connector cables, and other electrical interconnects useful in operablely coupling the camera 12 to the processing unit 50.

The field of view of the combined imaging system 10 is defined by the quantity of the target area 30 visible by the lens 28 of the camera 12. The field of view of the system 10 may be modified by altering the distance between the camera 12 and the reflector 14 and by altering the distance between the reflectors 14, 16. In the embodiment illustrated in FIG. 1, the reflector 14 is positioned about two inches away from the camera 12, as illustrated by an arrow 44, and the reflectors 14, 16 are displaced about six inches away from each other, as illustrated by an arrow 42. This configuration provides the system 10 with about a 28° field of view as illustrated in FIG. 1 by a number of arcs 46.

In the illustrative embodiment shown in FIG. 1, the camera 12 forms a combined image by receiving two perspective views of the target area 30 which are reflected to the lens 28 of the camera 12. The reflector 16 reflects a first perspective view of the target area 30, as illustrated in FIG. 1 by optical train lines 32 and 34, to the first portion 27 of the reflector 14. Similarly, the reflector 18 reflects a second perspective view of the target area 30, illustrated in FIG. 1 by optical train lines 36 and 40, to the second portion 29 of the reflector 14. The first and second portions 27, 29 of reflector 14 subsequently reflect the first and second perspective views to the lens 28 of the camera 12. The reflector 14 contemporaneously reflects both perspective views to the lens 28. The lens 28 of camera 12 receives a single image which is a combination of the first perspective view reflected by the first portion 27 of the reflector 14 and the second perspective view reflected by the second portion 29 of the reflector 14. The camera 12 renders the single combined image formed from the two perspective views. The first and second perspective views are perspective views of the target area 30 from opposite sides of the frontal axis 31. Due to the off frontal axis positioning of the reflectors 16, 18, the first and second perspective views are substantially different perspective views of the target area 30.

In the embodiment illustrated in FIG. 1, the combined image rendered by camera 12 is a stereo image because the first and second perspective views are different perspective views of the same target area. The stereo image is formed by contemporaneously reflecting the first and second perspective views to the lens 28 of the camera 12. The stereo image is a juxtaposed combination of the first and second perspective views. In particular, the stereo image formed by the illustrative embodiment shown in FIG. 1 is a horizontal juxtaposed combination of the perspective views because the first and second portions 27, 29 of the reflector 14 lie on the same horizontal plane. In other configurations, the reflective portions of the reflector 14 may lie on separate horizontal planes so as to form a combined or stereo image having perspective views in alternative orientations, for example in a vertical juxtaposed configuration.

The combined (i.e. stereo) image formed from the first and second perspective views is transmitted to the processing unit 50 by the camera 12 and the interconnects 48. In the illustrative embodiments, the camera 12 is an interlaced scanning camera, however, other types of cameras or imagers may be used. The camera 12 divides the image into two fields of odd and even rows. Each field contains information from both the first and the second perspective views. The camera 12 transmits the first field, for example the odd field, to the processing unit 50 via the interconnects 48. The processing unit 50 captures and stores the first field in a memory buffer. Subsequent to the transmission of the first field, the camera 12 transmits the second field, for example the even field, to the processing unit 50 via the interconnects 48. The processing unit 50 captures and stores the second field in another memory buffer. The full combined or stereo image, composed of the odd and even fields, are stored in the memory buffers and available to the processing unit 50 for analysis.

In the embodiment illustrated in FIG. 1, typical stereo vision analyzing techniques may be used to extract information from the combined image because the combined image is a stereo image. For example, triangulation techniques may be used to determine depth information of objects or areas of interest. In particular, with a known three dimensional position of the combined image system 10, for example the position of the system 10 within a motor vehicle, disparities between the first and second perspectives can be analyzed to determine the three dimensional coordinates of areas of interest. Additionally, the first and second perspectives can be compared to determine if an area of interest in rotating or translating which may be valuable information in some applications. Other techniques may also be used to process the combined or stereo image. For example, the first and second fields may be stored in a single buffer or alternative analyzing algorithms may be employed. Additionally, in some embodiments, the camera 12 may be a progressive scanning camera. In these embodiments, the combined or stereo image is transmitted to the processing unit 50 by the camera 12, received by the unit 50, and divided into fields by the unit 50 prior to the application of the stereo vision analyzing techniques.

Figure 2:
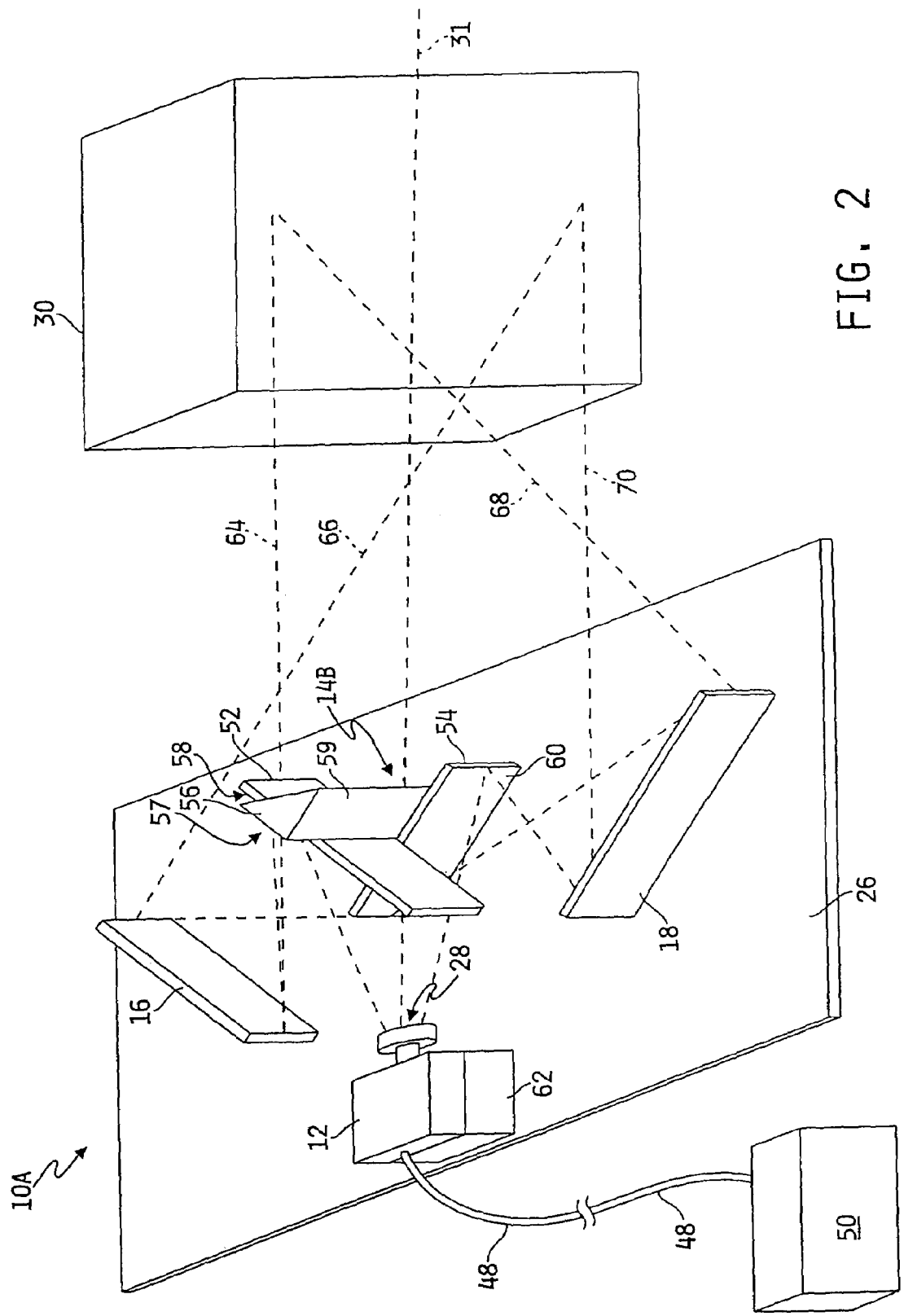
FIG. 2 is a diagrammatic perspective view of an alternative embodiment of a combined imaging system.

In another embodiment of the disclosure, the on-frontal-axis reflector 14B may be formed by a first reflective portion 52, a second reflective portion 54, and a support member 56 as illustrated in FIG. 2. The support member 56 is secured to the substrate 26 in front of the camera 12 by suitable fasteners, such as screws, bolts, or clamps. The member 56 has a triangular cross section and vertically extends away from the substrate 26 at a substantially perpendicular angle. The member 56 is positioned on the substrate 26 so as one of the three vertexes which define the triangular cross section substantially lies on the axis 31. In this configuration, a first side 57 of the member 56 faces the off-axis-reflector 16 and the lens 28 of the camera 12. Similarly, a second side 59 of the member 56 faces the off-axis-reflector 18 and the lens 28 of the camera 12.

The first and second portions 52, 54 of the reflector 14B are rectangular panels each having a substantially reflective side 58, 60, respectively. The first portion 52 is secured to the first side 57 of the member 56 so as the reflective side 58 of the portion 52 is in reflective communication with the reflector 16 and the lens 28 of the camera 12. The second portion 54 is secured to the second side 59 of the member 56 so as the reflective side 60 of the portion 54 is in reflective communication with the reflector 18 and the lens 28 of the camera 12. The first portion 52 is secured to the member 56 on the first side 57 at a position which is vertically higher on the member 56 than the position of the portion 54 secured to the second side 59 of the member 56. This configuration allows parts of the portions 52, 54 to extend horizontally away from the member 56 and vertically cross each other. A camera support 62 may be used in some applications to vertically raise the camera 12 from the substrate 26 so as the lens 28 of the camera 12 is better positioned to be in reflective communication with both portions 52, 54. Although in the embodiment illustrated in FIG. 2 the support member has a triangular cross section, support members having other geometric cross sections may be used. For example, support members having a square, rectangular, or hexagonal cross sections are contemplated.

In the embodiment illustrated in FIG. 2, the camera 12 forms a combined image in a manner similar to the embodiment illustrated in FIG. 1. In particular, the combined image is formed by reflecting two perspective views of the target area 30 to the lens 28. The reflector 16 reflects a first perspective view of the target area 30, as illustrated in FIG. 2 by optical train lines 64 and 66, to the first portion 52 of the reflector 14B. Similarly, the reflector 18 reflects a second perspective view of the target area 30, illustrated in FIG. 2 by optical train lines 68 and 70, to the second portion 54 of the reflector 14B. The reflector 14B subsequently reflects the first and second perspective views to the lens 28 of the camera 12. The reflector 14B contemporaneously reflects both perspective views to the lens 28. The lens 28 of camera 12 receives a single image which is a combination of the first perspective view reflected by the first portion 52 of the reflector 14B and the second perspective view reflected by the second portion 54 of the reflector 14B. The camera 12 renders the single combined image formed from the two perspective views. The first and second perspective views are perspective views of the target area 30 from opposite sides of the frontal axis 31. Due to the off frontal axis positioning of the reflectors 16, 18, the first and second perspective views are substantially different perspective views of the target area 30.

The combined image formed in the embodiment illustrated in FIG. 2 is a stereo image because the first and second perspective views are different perspective views of the same target area. Due to the different vertical positions of the portions 52, 54 on the member 56, the stereo image formed by the embodiment illustrated in FIG. 2 is a vertical juxtaposed combination of the perspective views.

The camera 12 transmits the combined (i.e. stereo) image to the processing unit 50 via the interconnects 48 using, for example, the interlaced frame technique. The processing unit 50 analyzes the stereo image using techniques similar to those techniques discussed above in regard to FIG. 1. The relative vertical or horizontal positioning of the first and second perspective views in the combined image does not substantially alter the processing techniques. In particular, the perspective views may be orientated in several different positions in the combined image. The areas analyzed by the processing unit may be predetermined depending upon the positioning of the first and second perspective views within the stereo image so as to allow use of typical processing techniques regardless of the orientation of the perspective views.

Figure 3:
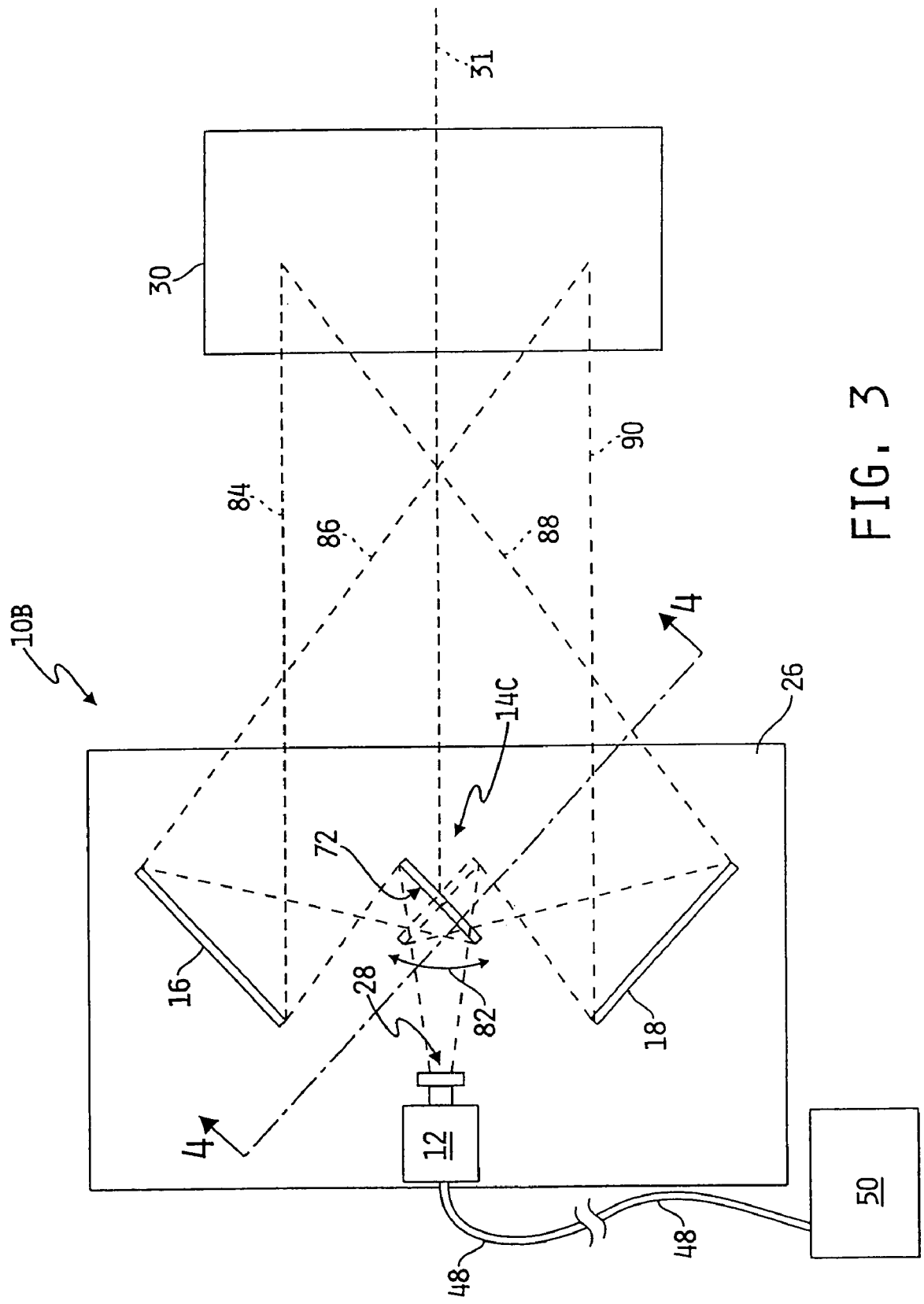
FIG. 3 is a top plan view of another alternative combined imaging system.
Figure 4:
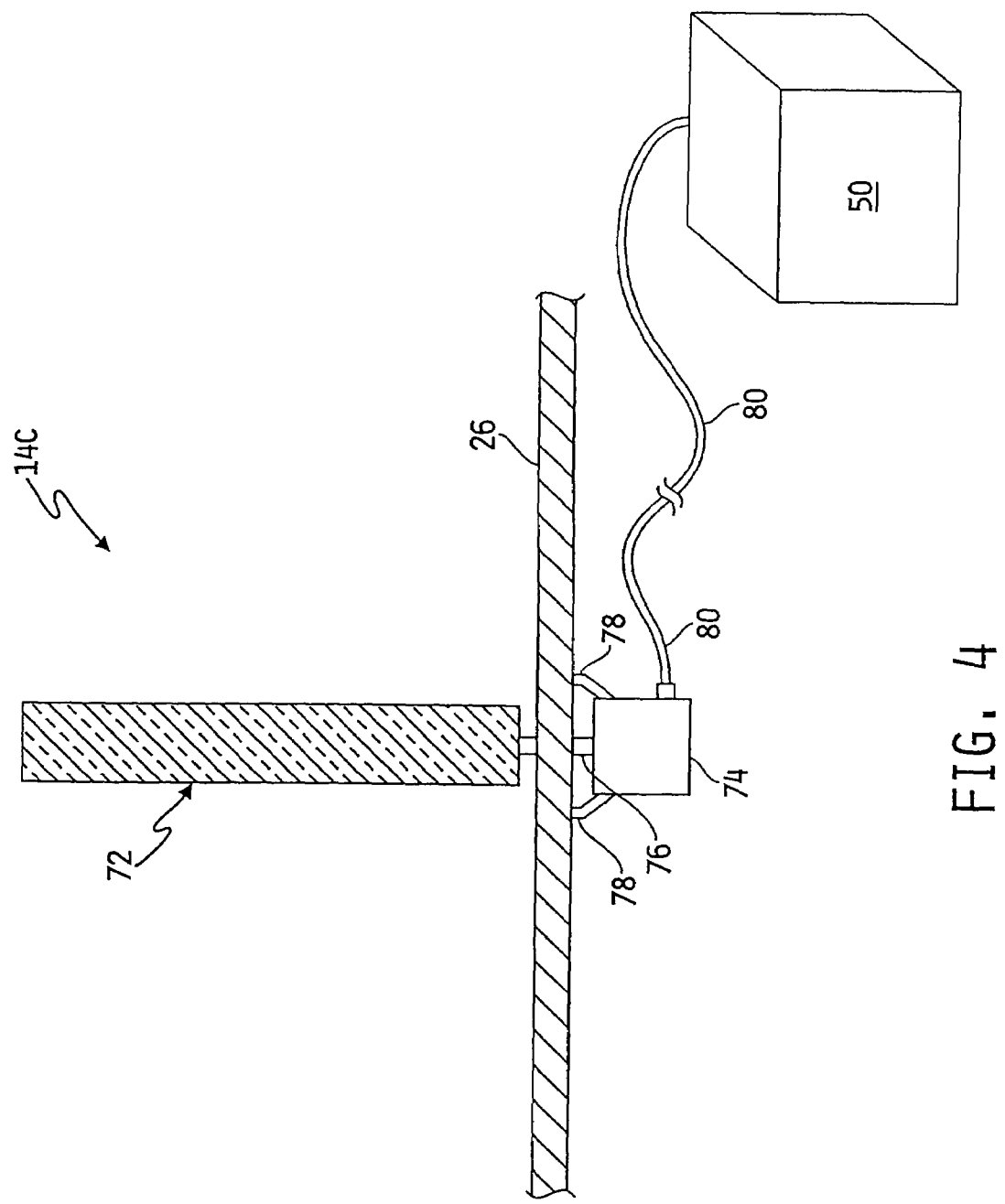
FIG. 4 is a cross-sectional view of the combined imaging system of FIG. 3 viewed along section lines 4—4.

In a further embodiment of the disclosure, the on-frontal-axis reflector 14C is formed from a rectangular panel having a substantially reflective side 72. The reflector 14C is positioned on the substrate 26 in front of the lens 28 of the camera 12 and substantially on the axis 31. Additionally, the reflector 14C is movable between a first position and a second position using suitable means for movement. For example, as illustrated in FIGS. 3 and 4, the reflector 14C is rotatable about a center axis. When in the first position (solid line) the reflector 14C is in reflective communication with the reflector 16 and the lens 28 of the camera 12. When in the second position (phantom line) the reflector 14C is in reflective communication with the reflector 18 and the lens 28 of the camera 12. It should be noted that when the reflector 14C is in the first position, the reflector 14C is not in reflective communication with the reflector 18. Additionally, when in the second position, the reflector 14C is not in reflective communication with reflector 16.

An actuator 74, for example a galvanometer, is operably coupled to the reflector 14C via a drive shaft 76 so as to provide means to rotate the reflector 14C as illustrated in FIG. 4. The drive shaft 76 is coupled to the reflector 14C using suitable fasteners, for example screws, bolts, or clamps. Additionally, the actuator 74 may be secured to the same side of substrate 26 as the reflector 14C . Alternatively, the actuator 74 may be secured to an opposite side of substrate 26 as illustrated in FIG. 4. In the latter configuration, the drive shaft 76 of the actuator 74 is coupled to the reflector 14C through an access hole (not shown) in the substrate 26. In either configuration, a support bracket assembly 78 and screws or other suitable fasteners may be used to secure the actuator 74 to the substrate 26. In some applications, a gear assembly may be operably coupled between the drive shaft 76 and the reflector 14C . In addition, other means of moving reflector 14C between the first and second position may be used. For example, reflector 14C may be pivoted at one end.

The actuator 74 is also coupled to the processing unit 50 via electrical interconnects 80. The electrical interconnects 80 may include such interconnects as wires, cables, and other electrical interconnects useful in operably coupling the actuator 74 to the processing unit 50. The processing unit 50 controls the rotation of the reflector 14C by controlling the operation of the actuator 74. The reflector 14C may be rotated by the cooperation of the unit 50 and the actuator 74 in a clockwise or counter clockwise direction as illustrated in FIG. 3 by an arrow 82.

In the embodiment illustrated in FIGS. 3–4, the processing unit 50 forms a combined image by receiving and processing two images each containing different perspective views of a target area. The processing unit 50 rotates the reflector 14C to the first position (solid line) in reflective communication with the reflector 16 and the lens 28 of the camera 12. A first image containing a first perspective view, illustrated by optical train lines 84 and 86, of the target area 30 is reflected to the reflector 14C by the reflector 16. The reflector 14C subsequently reflects the first image to the lens 28 of the camera 12. The camera 12 transmits the first image to the processing unit 50 via the interconnects 48 using, for example, the interlaced frame technique. The processing unit 50 subsequently rotates the reflector 14C to the second position (phantom line) in reflective communication with the reflector 18 and the lens 28 of the camera 12. A second image containing a second perspective view, illustrated by optical train lines 88 and 90, of the target area 30 is reflected to the reflector 14C by the reflector 18. The reflector 14C subsequently reflects the second image to the lens 28 of the camera 12. The camera 12 transmits the second image to the processing unit 50 via the interconnects 48 using, for example, the interlaced frame technique. The first and second perspective views contained in the first and second images, respectively, are perspective views of the target area 30 from opposite sides of the frontal axis 31. Due to the off frontal axis position of the reflectors 16, 18, the first and second perspective views are substantially different perspective views of the target area 30.

The processing unit 50 coordinates the camera 12 and the speed and positioning of the reflector 14C so as to render an image at a correct time point (i.e. when the reflector 14C is in the first and second positions). After receiving each of the first and second images, the processing unit 50 forms a combined image by storing and processing the first and second images. The combined image formed by the first and second images is a stereo image because each of the first and second image depict a different perspective view of the same target area 30. The processing unit 50 captures, stores, and analyzes the combined (i.e. stereo) image using techniques similar to the techniques described above in regard to FIG. 1. The even and odd fields of the first image containing the first perspective view and the second image containing the second perspective view are stored in suitable memory locations or buffers of the processing unit 50. The processing unit 50 may subsequently use typical analyzing techniques to extract information from the combined image, such as those techniques described above in regard to FIG. 1. For example, the processing unit may analyze areas of interest by comparing the respective fields of the first and second images.

Figure 5A:
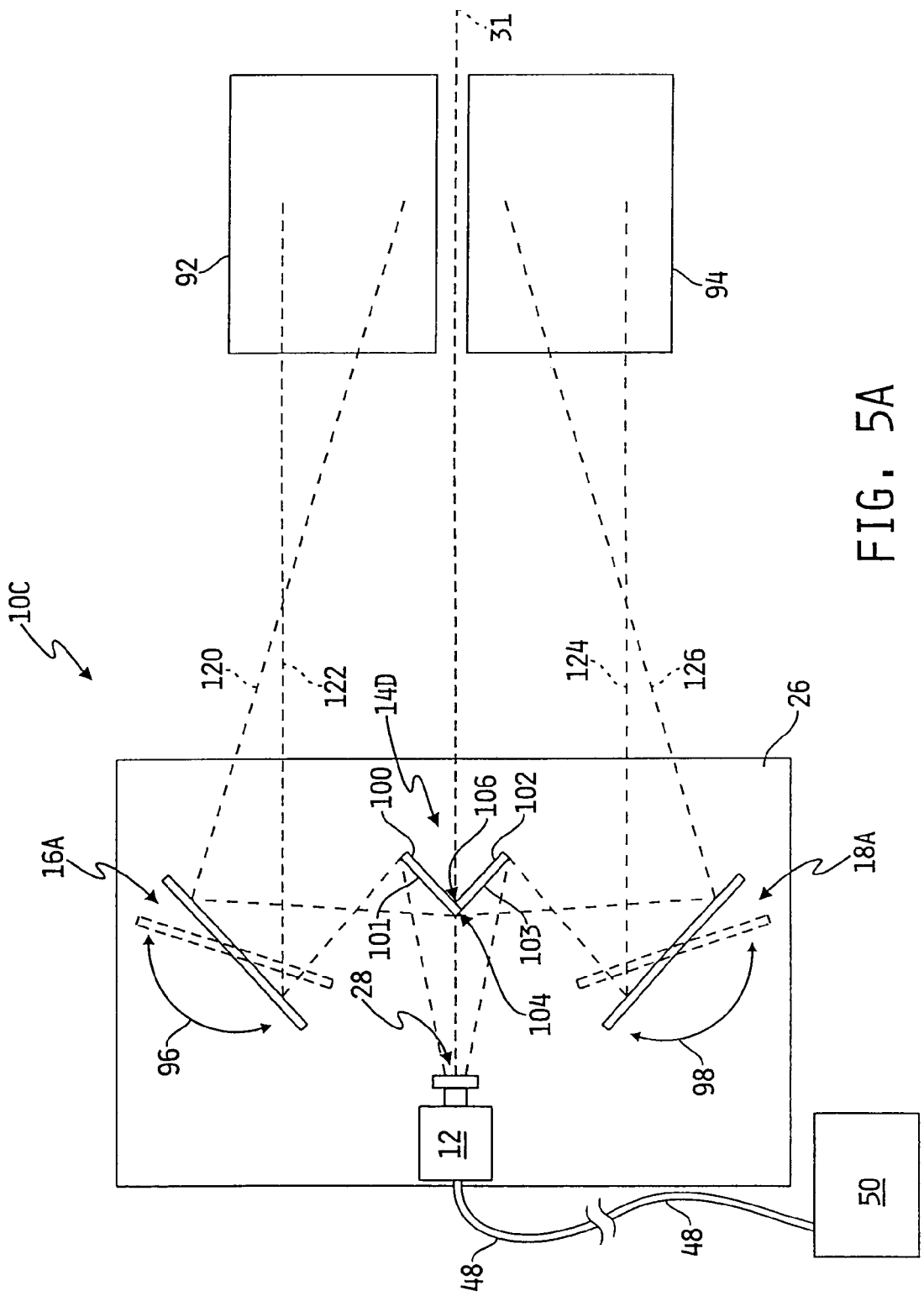
FIG. 5a is a top plan view of yet another embodiment of a combined imaging system illustrating rotatable off-frontal-axis reflectors rotated to a first position.
Figure 5B:
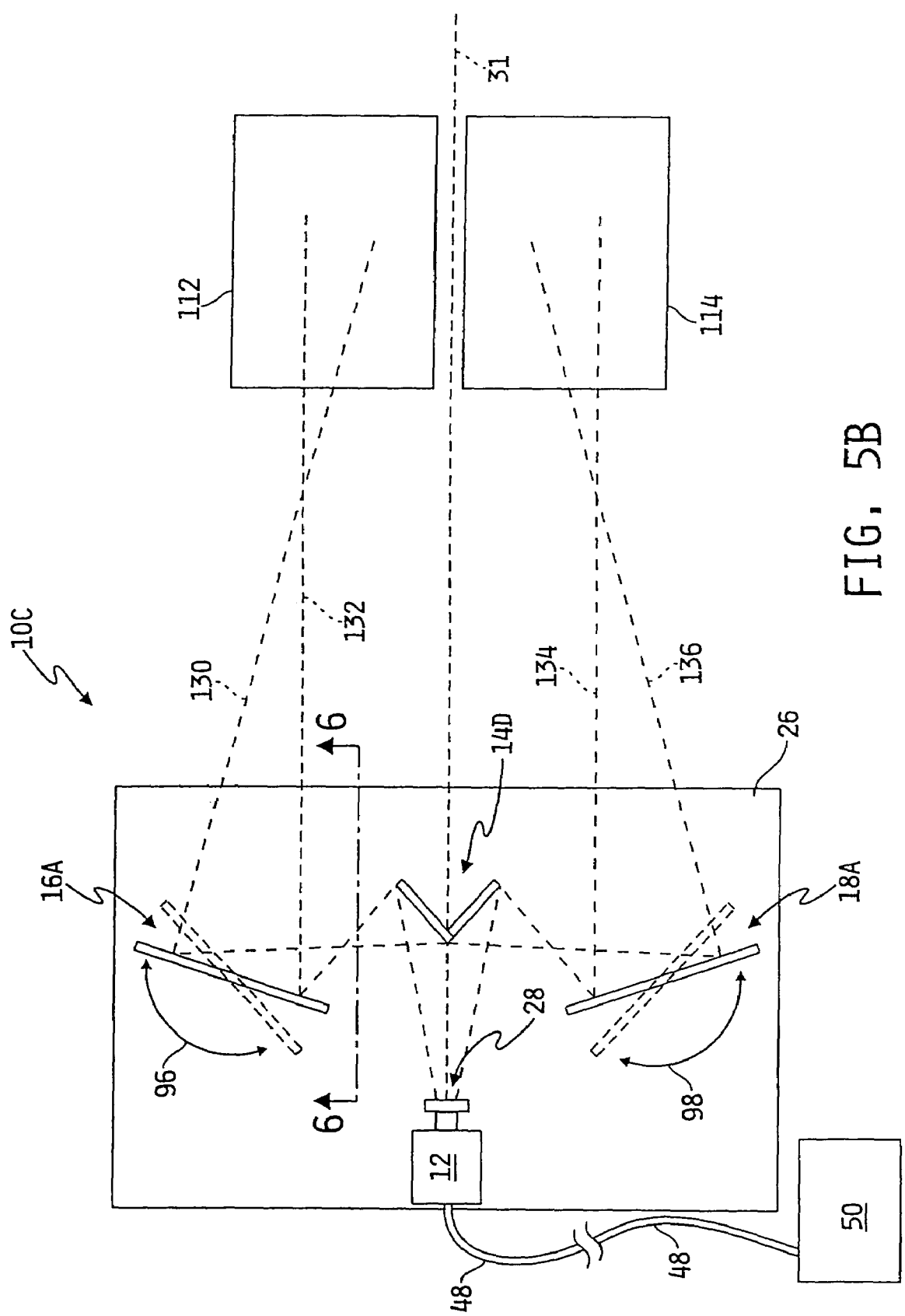
FIG. 5b is a top plan view of the combined imaging system of FIG. 5a illustrating the rotatable off-frontal-axis reflectors rotated to a second position.
Figure 6:
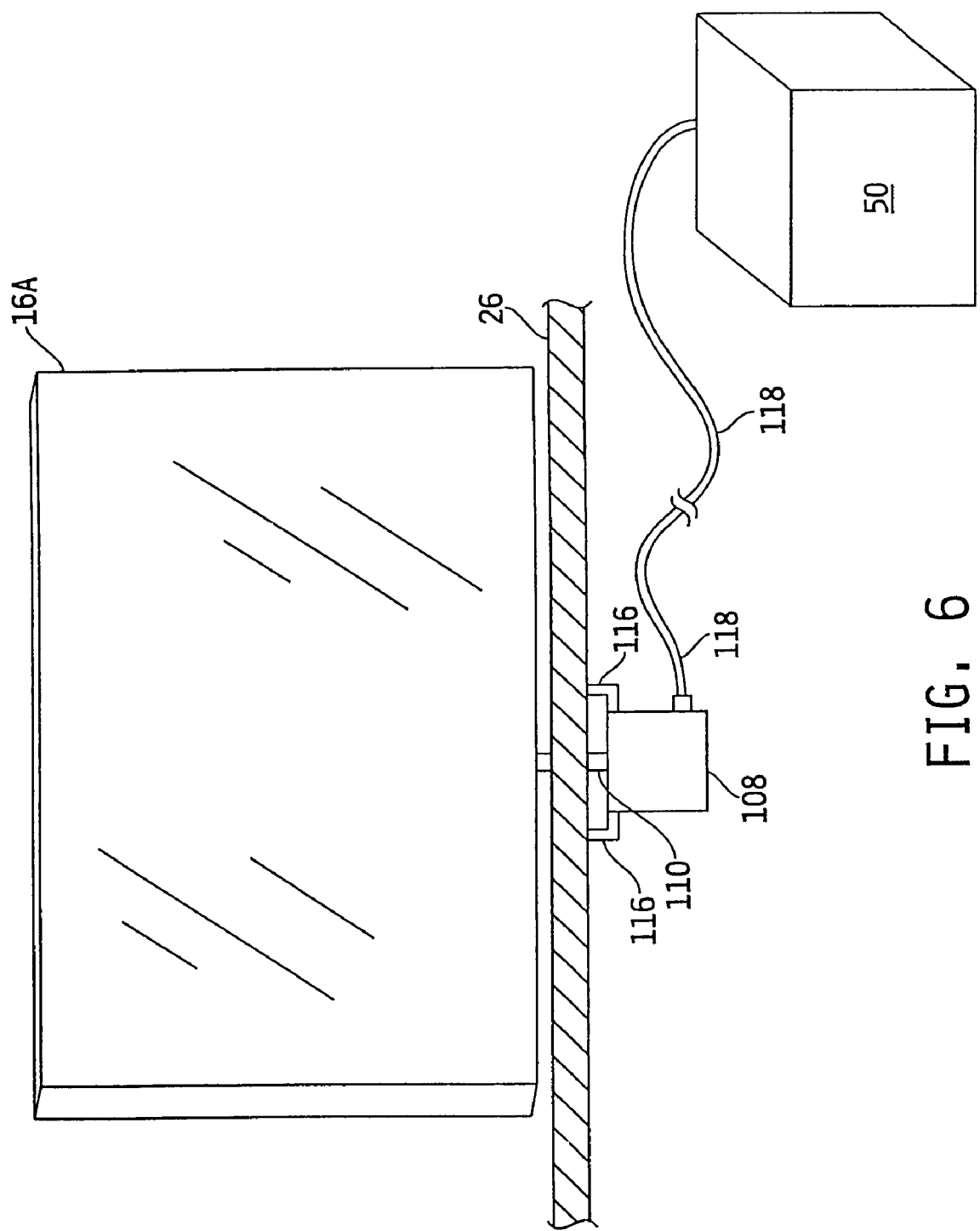
FIG. 6 is a cross-sectional view of the combined imaging system of FIGS. 5a and 5b viewed along section lines 6—6.

In yet a further embodiment of the disclosure, the off-frontal-axis reflector 16A is movable between a first position and a second position. Similarly, the off-frontal-axis reflector 18A is movable between a third position and a fourth position. For example, as illustrated in FIGS. 5–6, the reflectors 16A, 18A are rotatable around a center axis. In particular, the reflector 16A is movable between the first position (solid line in FIG. 5a) which is in reflective communication with a first target area 92 and the second position (solid line in FIG. 5b) which is in reflective communication with a second target area 112. The reflector 16A is also in reflective communication with a on-frontal-axis reflector 14D in both the first and second positions. The reflector 18A is movable between the third position (solid line in FIG. 5a) which is in reflective communication with a third target area 94 and the fourth position (solid line in FIG. 5b) which is in reflective communication with a fourth target area 114. Similar to reflector 16A, the reflector 18A is in reflective communication with the on-frontal-axis reflector 14D in both the third and fourth positions.

Each of the reflectors 16A, 18A are coupled to separate actuators, for example galvanometers, so as to provide means of motion. The coupling and operation of each actuator and respective reflector 16A, 18A are substantially similar. Therefore, the coupling and operation of the actuators and respective reflectors 16A, 18A are described in regard to reflector 16A only with the understanding that the coupling and operation of reflector 18A is substantially similar. As illustrated in FIG. 6, an actuator 108 is operably coupled to reflector 16A via a drive shaft 110. The drive shaft 110 is coupled to the reflector 16A using suitable fasteners, for example screws, bolts, or clamps. Additionally, the actuator 108 may be secured to the same side of substrate 26 as the reflector 16A. Alternatively, the actuator 108 may be secured to an opposite side of the substrate 26 as illustrated in FIG. 6. In the latter configuration, the drive shaft 110 of the actuator 108 is coupled to the reflector 16A through an access hole (not shown) in the substrate 26. In either configuration, a support bracket assembly 116 and screws or other suitable fasteners may be used to secure the actuator 108 to the substrate 26. In some applications, a gear assembly may be operably coupled between the drive shaft 110 and the reflector 16A. In addition, other means of moving reflector 16A between the first and second position may be used. For example, reflector 16A may be pivoted at one end between the first and second positions.

The reflector 14D is formed from a first rectangular panel portion 100 having a first end 104 and a second rectangular panel portion 102 having a second end 106. The first and second portions 100, 102 each have a substantially reflective side 101, 103, respectively. The first end 104 of the first portion 100 is perpendicularly abutted to the first end 106 of the second portion 102 so as to form a vertex. The reflector 14D, formed from the first and second portions 100, 102, is secured to the substrate 26 in front of the camera 12 in a position so as the vertex lies substantially on the frontal axis 31. In this configuration, the reflective side 101 of the first portion 100 is in reflective communication with the reflector 16A and the lens 28 of the camera 12. The reflective side 103 of the second portion 102 is in reflective communication with the reflector 18A and the lens 28 of the camera 12. Although in the embodiment illustrated in FIGS. 5–6, the reflector 14D is formed from two portions, the reflector 14D may also be formed from a single reflective panel having two ends displaced toward each other similar to the reflector 14 of FIG. 1.

The actuator 108 is also coupled to the processing unit 50 via electrical interconnects 118. The interconnects 118 may include such interconnects as wires, cables, and other electrical interconnects useful in operably coupling the actuator 118 to the processing unit 50. The processing unit 50 controls the rotation of the reflectors 16A, 18A by controlling the operation of the actuators. The reflectors 16A, 18A may be rotated by the cooperation of the unit 50 and the actuators in a clockwise or counter clockwise direction as illustrated in FIGS. 5a–b by arrows 96, 98, respectively.

In the embodiment illustrated in FIGS. 5–6, a combined image is formed by reflecting two perspective views of a target area to the lens 28 of the camera 12. The processing unit 50 rotates the reflector 16A to the first position (solid line in FIG. 5a) in reflective communication with the reflective side 101 of the reflector 14D and the first target area 92. The processing unit 50 also rotates the reflector 18A to the third position (solid line in FIG. 5a) in reflective communication with the reflective side 103 of the reflector 14D and the third target area 94. When in the first position, the reflector 16A reflects a perspective view, illustrated by optical train lines 120 and 122 in FIG. 5a, of the target area 92 to the reflective side 101 of the reflector 14D. Similarly, when in the third position, the reflector 18A subsequently reflects a perspective view, illustrated by optical train lines 124 and 126 in FIG. 5a, of the target area 94 to the reflective side 103 of the reflector 14D. The reflective sides 101, 103 of the reflector 14D subsequently reflects the perspective views of the target areas 92, 94 to the lens 28 of the camera 12. The lens 28 of the camera 12, therefore, receives a single image which is a combination of the perspective view reflected by the reflective side 101 of the reflector 14D and the perspective view reflected by the reflective side 103 of the reflector 14D. The camera 12 receives the combined image formed from the two perspective views.

To view additional target areas, the processing unit 50 may rotate the reflector 16A to a second position and reflector 18A to a fourth position. In the second position, reflector 16A reflects a perspective view, illustrated by optical train lines 130 and 132 in FIG. 5b, of the second target area 112 to the reflector 14D. Similarly, in the fourth position, the reflector 18A reflects a perspective view, illustrated by optical train lines 134 and 136 in FIG. 5b, of the fourth target area 114 to the reflector 14D. The perspective views from the reflectors 16A, 18A are subsequently reflected to the lens 28 of the camera 12 by the reflector 14D as described above in regard to FIG. 5a. The processing unit 50 may continue to rotate the reflectors 16A, 18A to various positions so as to reflect perspective views of different selective target areas. If the selected target areas are different target areas, for example target area 92, 94 as illustrated in FIG. 5a, then the two perspective views will be different perspective views of different target areas and will form a combined image when received by the camera 12. Alternatively, if the target areas are identical target areas, for example if target area 92 and target area 94 are identical, the two perspective views will be different perspective views of the same target area and will form a combined image which is a stereo image when received by the camera 12.

The processing unit 50 coordinates the camera 12 and the speed and positioning of the reflectors 16A, 18A so as to render an image at a correct time point (i.e. when the reflectors 16A, 18A are in the correct positions). The combined image formed by the perspective views of target areas 92, 94 is reflected to the processing unit 50 by the camera 12 and the interconnects 118 using, for example, the interlaced frame technique. The processing unit 50 captures the combined image and analyzes the image to extract desirable information. If the combined image is a stereo image, the processing unit 50 may analyze the combined image using techniques similar to those discussed above in regard to FIG. 1. However, if the combined image is not a stereo image, three dimensional information may not obtainable. However, other processing techniques may be used to extract information from the combined image. For example, the occupancy of motor vehicle passengers in two different target areas may be detected.

Figure 7:
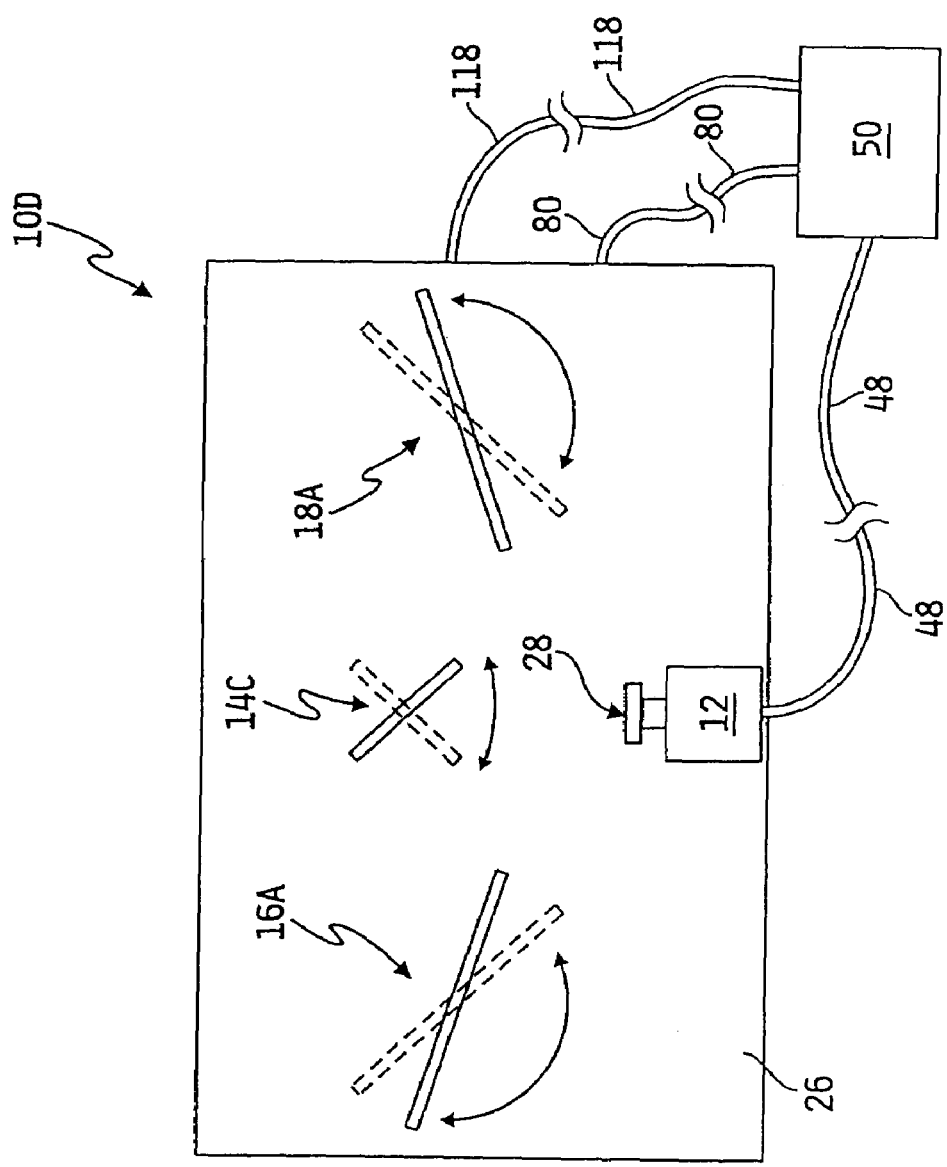
FIG. 7 is a top plan view of still another embodiment of a combined imaging system.

In some applications, a combined image system 10D may incorporate the combination of the embodiments illustrated and described in regard to FIGS. 3–4 and FIGS. 5–6. In particular, as shown in FIG. 7, the system 10D includes the on-center-axis reflector 14C movable between a first and second position and off-center-axis reflectors 16A, 18A separately movable between a first and second position and a third and fourth position, respectively. The operation of the reflector 14C is substantially similar to the operation of the reflector 14C described in regard to FIGS. 3–4. The operation of the reflectors 16A, 18A are similar to the operation of the reflectors 16A, 18A described in regard to FIGS. 5–6. In the embodiment illustrated in FIG. 7, the processing unit 50 coordinates the speed and positioning of each reflector 14C, 16A, 18A so as to render an image at the correct time point (i.e. when the reflectors 14C, 16A, 18A are each in the correct position). If the perspective views reflected by the reflectors 16A, 18A are different perspective views of an identical target area, the camera 12 receives a combined image which is a stereo image. The processing unit 50 may analyze the stereo image using techniques similar to those discussed above in regard to FIG. 1. Conversely, if the perspective views reflected by the reflectors 16A, 18A are perspective views of different target areas, the camera 12 receives a combined image which is not be a stereo image. The processing unit 50 may analyze the combined image using techniques similar to those discussed above in regard to FIGS. 5–6.

Figure 8B:
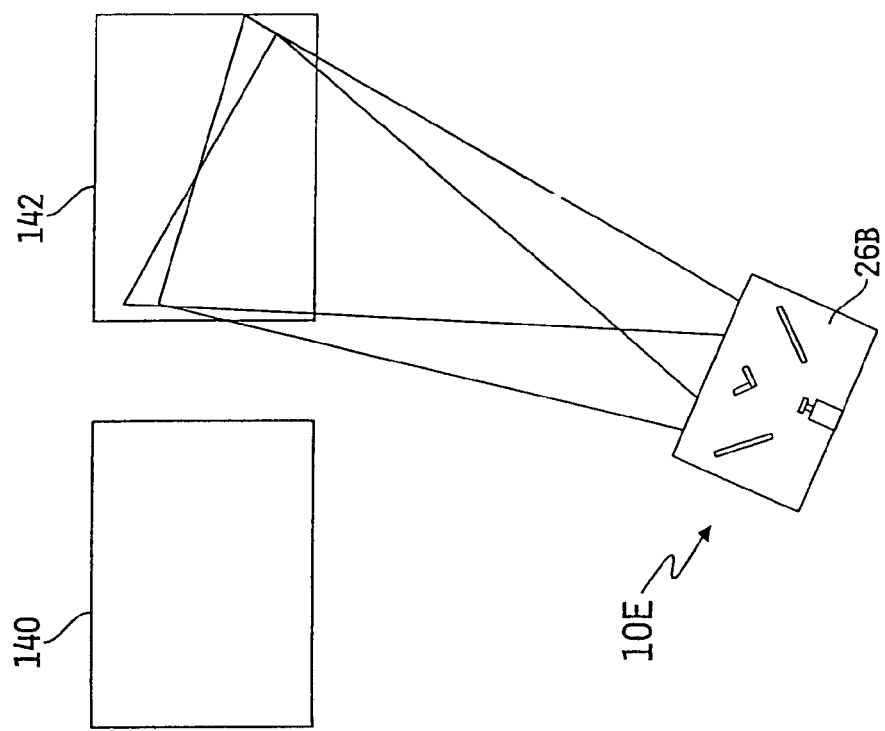
Figure 8A:
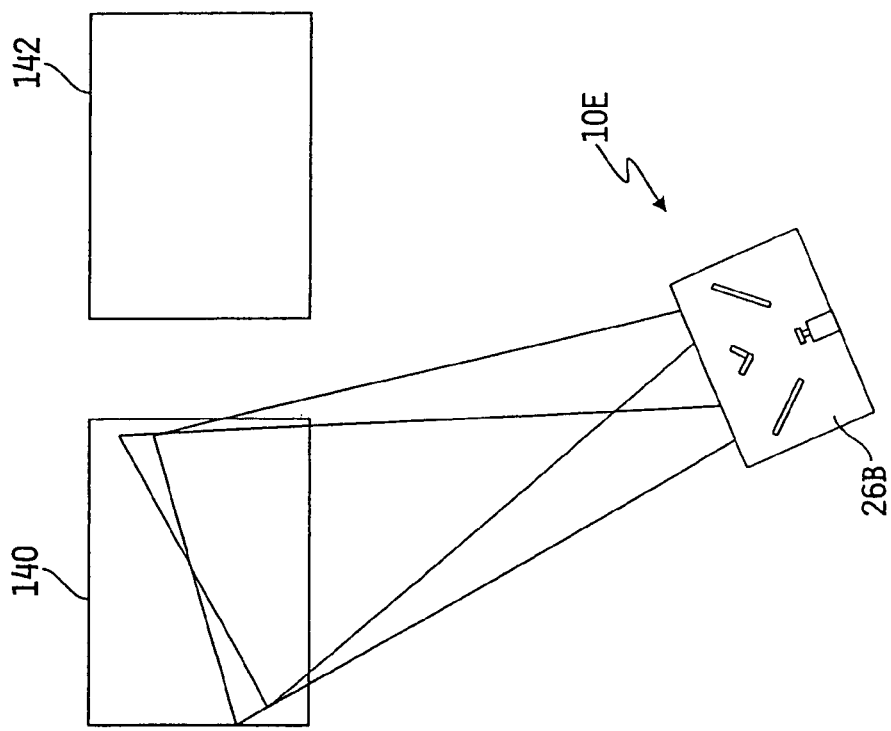
FIG. 8a is a top plan view of the combined imaging system of FIG. 1 positioned to have a perspective view of a target area.

In yet a further embodiment, a substrate 26B of a combined image system 10E may be movable between a first position and a second position as illustrated in FIGS. 8a–b. Moving the substrate 26B alters the target view of the system 10E. In particular, when in the first position, as shown in FIG. 8a, the system 10E has a target view of a first target area 140. When in the second position, as shown in FIG. 8b, the system 10E has a target view of a second target area 142. Therefore, a single system 10E can target a plurality of areas of interest. For example, a single system 10E can monitor a driver occupying a first target area of a motor vehicle and a passenger occupying a second target area of the motor vehicle by alternating between the two target areas. The operation of the system 10E may be similar to any of the embodiments illustrated in FIGS. 1–7. For example, a combined image rendered by the system 10E may be analyzed using the techniques discussed above in regard to FIGS. 1, 3–4, 5–6, or 7.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

The invention claimed is:

1. An apparatus for generating a combined image of an object, the apparatus comprising:
   a first reflector;
   a second reflector in reflective communication with the first reflector and with a first portion of the object corresponding to a first perspective view of the object;
   a third reflector in reflective communication with the first reflector and a second portion of the object corresponding to a second perspective view of the object;

a camera receiving the first and second perspective views from the first reflector and forming the combined image from the first and second perspective views; and a substrate, the first reflector, second reflector, third reflector, and camera being secured to the substrate, the substrate being movable between a first position and a second position.

2. The apparatus of claim 1, wherein the first reflector includes a first reflective portion in reflective communication with the second reflector and a second reflective portion in reflective communication with the third reflector.

3. The apparatus of claim 1, wherein the first reflector includes a reflective panel having a first end and a second end, the first and second ends being displaced toward each other to form a vertex substantially in the center of the reflective panel.

4. The apparatus of claim 1, further comprising an actuator coupled to the first reflector, the actuator moving the first reflector between a first position in reflective communication with the second reflector and a second position in reflective communication with the third reflector.

5. The apparatus of claim 4, wherein the actuator comprises a galvanometer.

6. The apparatus of claim 1, further comprising a first actuator coupled to the second reflector and a second actuator coupled to the third reflector, the first actuator moving the second reflector between a first position and a second position, the second actuator moving the third reflector between a first position and a second position.

7. The apparatus of claim 6, wherein the first and second actuators comprise galvanometers.

8. The apparatus of claim 1, wherein the apparatus is coupled to a motor vehicle.

9. The apparatus of claim 1, further comprising a processing unit coupled to the camera.

10. The apparatus of claim 1, wherein the combined image is a stereo image.

11. An apparatus for generating a combined image of an object, the apparatus comprising:

a first reflector movable between a first position and a second position;

a second reflector in reflective communication with the first reflector when the first reflector is in the first position and with a first portion of the object corresponding to a first perspective view of the object;

a third reflector in reflective communication with the first reflector when the first reflector is in the second position and a second portion of the object corresponding to a second perspective view of the object;

a camera receiving the first and second perspective views from the first reflector;

a processing unit coupled to the camera, the processing unit receiving the first and second perspective views from the camera and forming the combined image from the first and second perspective views; and a substrate, the first reflector, second reflector, third reflector, and camera being secured to the substrate, the substrate being movable between a first position and a second position.

12. The apparatus of claim 11, further comprising an actuator coupled to the first reflector, the actuator moving the first reflector between the first and second positions.

13. The apparatus of claim 12, wherein the actuator is a galvanometer.

14. The apparatus of claim 11, wherein the first reflector comprises a panel having at least one substantially reflective side.

15. The apparatus of claim 11, further comprising a first actuator coupled to the second reflector and a second actuator coupled to the third reflector, the first actuator moving the second reflector between a first position and a second position, the second actuator moving the third reflector between a first position and a second position.

16. The apparatus of claim 15, wherein the first and second actuators comprise galvanometers.

17. The apparatus of claim 11, wherein the apparatus is coupled to a motor vehicle.

* * * * *